United States Patent
Pai et al.

(10) Patent No.: US 10,070,274 B2
(45) Date of Patent: Sep. 4, 2018

(54) METHODS AND SYSTEMS FOR CONTROLLING COMMUNICATION DEVICES AFFILIATED WITH TALK GROUPS

(71) Applicant: MOTOROLA SOLUTIONS, INC., Chicago, IL (US)

(72) Inventors: Madhusudan K. Pai, Palatine, IL (US); Dominic Lazara, Park Ridge, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/365,282

(22) Filed: Nov. 30, 2016

(65) Prior Publication Data

US 2018/0152815 A1    May 31, 2018

(51) Int. Cl.
*H04W 4/08* (2009.01)
*H04W 4/10* (2009.01)
(Continued)

(52) U.S. Cl.
CPC ............. *H04W 4/08* (2013.01); *H04W 4/10* (2013.01); *H04W 52/0219* (2013.01); *H04W 76/045* (2013.01); *H04W 76/25* (2018.02)

(58) Field of Classification Search
CPC .................. H04W 4/08; H04W 4/10; H04W 52/02–52/0296; H04W 76/25; H04W 76/45
See application file for complete search history.

(56) References Cited

U.S. PATENT DOCUMENTS 5,745,860 A * 4/1998 Kallin ............... H04W 52/0229
455/574
9,363,772 B2    6/2016 Burks
(Continued)

FOREIGN PATENT DOCUMENTS

WO    2004062306    7/2004

OTHER PUBLICATIONS

Radio Resource Control, https://en.wikipedia.org/wiki/Radio_Resource_Control (accessed Nov. 30, 2016) (2 pages).
(Continued)

Primary Examiner — Raymond Dean
(74) Attorney, Agent, or Firm — Michael Best & Friedrich LLP

(57) ABSTRACT

Method and system for controlling a plurality of communication devices. One system includes a server for a communication system in which each of a plurality of communication devices is affiliated with at least one talk group among a plurality of talk groups. The server includes an electronic processor configured to determine whether each communication device of the plurality of communication devices is in a connected state. The electronic processor is further configured to determine that at least one talk group does not include any communication devices affiliated with the at least one talk group that are in the connected state. The electronic processor is further configured to place at least one communication device affiliated with the at least one talk group in an artificially-connected state based on at least one characteristic of the communication devices affiliated with the at least one talk group.

20 Claims, 5 Drawing Sheets

(51) Int. Cl.
H04W 52/02 (2009.01)
H04W 76/04 (2009.01)
H04W 76/25 (2018.01)

(56) References Cited

U.S. PATENT DOCUMENTS

| | | | |
|---|---|---|---|
| 9,584,987 B1* | 2/2017 | Bar-On | H04W 4/10 |
| 2005/0143056 A1* | 6/2005 | Iyer | H04W 4/10 |
| | | | 455/416 |
| 2007/0082690 A1 | 4/2007 | Fabien et al. | |
| 2010/0062771 A1* | 3/2010 | Sundberg | H04B 17/0077 |
| | | | 455/436 |
| 2011/0239011 A1* | 9/2011 | Waris | H04L 12/12 |
| | | | 713/310 |
| 2013/0072249 A1 | 3/2013 | Rosen et al. | |
| 2013/0182622 A1* | 7/2013 | Lin | H04W 52/0251 |
| | | | 370/311 |
| 2016/0135247 A1* | 5/2016 | Ozturk | H04W 52/0212 |
| | | | 455/436 |
| 2017/0303194 A1* | 10/2017 | Ahn | H04W 52/027 |

OTHER PUBLICATIONS

PCT/US2017/059038 International Search Report and Written Opinion of the International Searching Authority dated Jan. 17, 2018 (16 pages).

* cited by examiner

METHODS AND SYSTEMS FOR CONTROLLING COMMUNICATION DEVICES AFFILIATED WITH TALK GROUPS

BACKGROUND OF THE INVENTION

Communication devices, for example, two-way radios, land mobile radios, broadband devices, etc. are used in many applications throughout many industries. In push-to-talk communication systems, characteristics such as fast call setup time between communication devices and less power consumption by the communication devices are often desired. However, decreasing call setup time for a communication device often increases power consumption of the communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
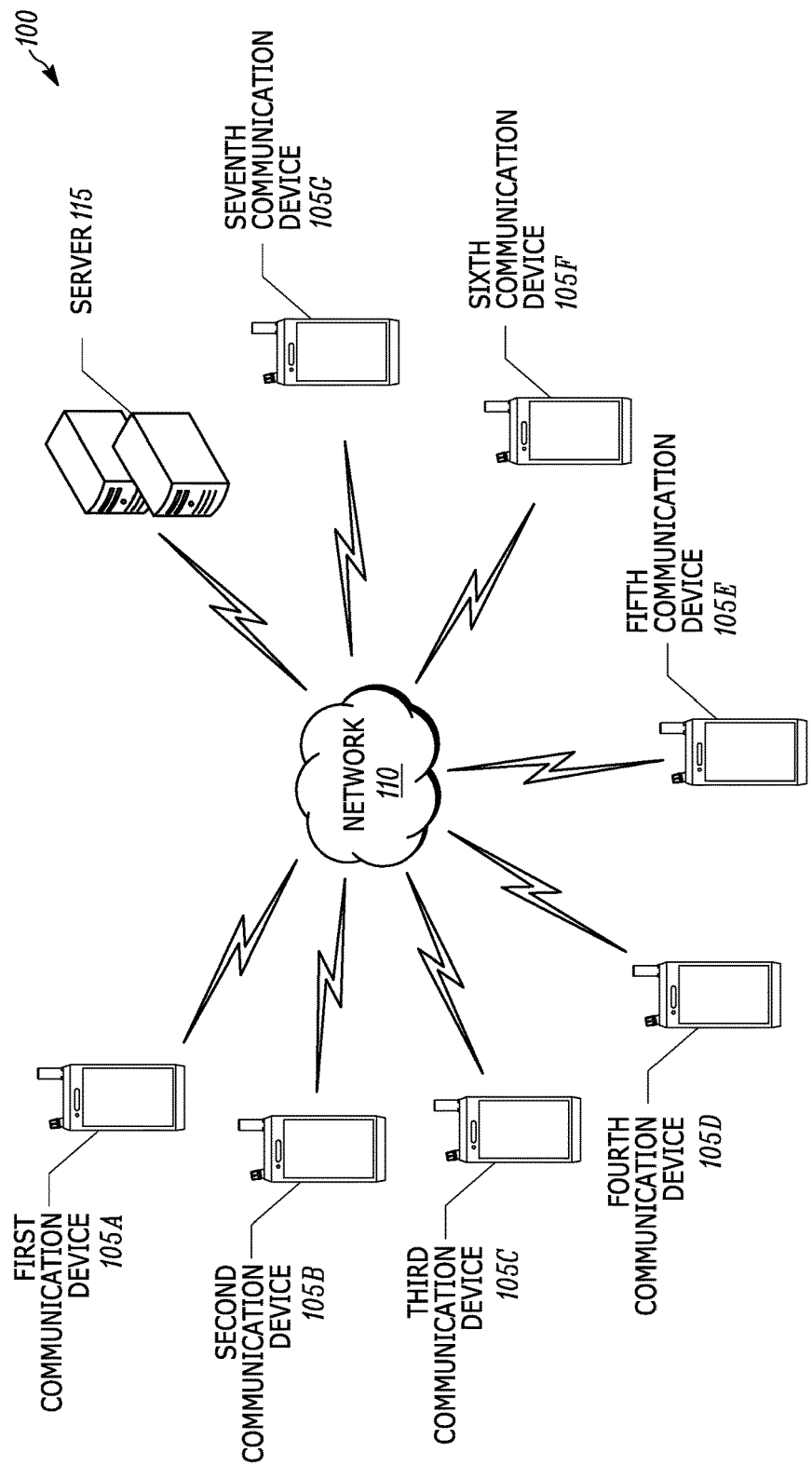
FIG. 1A is a diagram of a communication system according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a server for a communication system in which each of a plurality of communication devices is affiliated with at least one talk group among a plurality of talk groups. The server includes an electronic processor configured to determine whether each communication device of the plurality of communication devices is in a connected state. The electronic processor is further configured to determine that at least one talk group of the plurality of talk groups does not include any communication devices affiliated with the at least one talk group that are in the connected state. The electronic processor is further configured to place at least one communication device affiliated with the at least one talk group in an artificially-connected state based on at least one characteristic of the communication devices affiliated with the at least one talk group.

Another embodiment provides a method of controlling a plurality of communication devices. Each communication device is affiliated with at least one talk group among a plurality of talk groups. The method includes determining whether each communication device of the plurality of communication devices is in a connected state. The method further includes determining that at least one talk group of the plurality of talk groups does not include any communication devices affiliated with the at least one talk group that are in the connected state. The method further includes placing at least one communication device affiliated with the at least one talk group in an artificially-connected state based on at least one characteristic of the communication devices affiliated with the at least one talk group.

FIG. 1A is a diagram of a communication system 100 according to one exemplary embodiment. The communication system 100 includes a plurality of communication devices. In the example illustrated in FIG. 1A, a first communication device 105A, a second communication device 105B, a third communication device 105C, a fourth communication device 105D, a fifth communication device 105E, a sixth communication device 105F, and a seventh communication device 105G are shown. In the following description, when explaining how a single communication device functions, a reference to communication device 105 is used. It is not necessary, however, that the communication devices 105A through 105G be identical. The communication devices 105A through 105G are merely exemplary. In some embodiments, the communication system 100 may include more or fewer communication devices than illustrated in FIG. 1A.

The communication devices 105A through 105G communicate with each other over a network 110. The network 110 may be a wired or a wireless communication network. All or parts of the network 110 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 110 may also include future developed networks. In some embodiments, the network 110 may also include a combination of the networks mentioned previously herein. In some embodiments, the communication devices 105A through 105G may communicate directly with each other using a communication channel or connection that is outside of the network 110. For example, the plurality of communication devices 105A through 105G may communicate directly with each other when they are within a predetermined distance from each other.

The communication system 100 also includes a server 115 that monitors the communication devices 105A through 105G in some embodiments. In some embodiments, the server 115 is a computer maintained, for example, at a call center or public safety command center. In some embodiments, the server 115 controls communication between the communication devices 105A through 105G over the network 110 in accordance with talk group affiliation as explained in greater detail below.

As illustrated in FIG. 1A, the communication device 105 may be a handheld communication device, for example, a mobile telephone or other portable communication device, mobile radio, smart watch or other smart wearable, drone, or other device configured to communicate over the network 110. In some embodiments, the communication device 105 may be a handheld radio carried by a public safety officer or first responder, such as a police officer. In some embodiments, the communication device 105 may be a mobile communication device mounted in or on a vehicle (for example, a police vehicle). In some embodiments, the communication device 105 may be a device maintained, for example, at a call center or public safety command center.

In some embodiments, the communication devices 105A through 105G are affiliated with or assigned to one or more talk groups associated with the network 110. As used herein, a talk group is a virtual radio channel (a shared channel selected from a group of channels or available frequencies) used for communication between a plurality of communications devices, other devices, or a combination thereof. A talk group may be defined or assigned based on various criteria. For example, a talk group may be established for devices associated with a particular public safety organization or department, a particular incident, a particular member role or designation, or a combination thereof. For example, a talk group may relate to an organization of first responders, a group of police officers, a fire incident, or a combination thereof. Similarly, a talk group may relate to members having the same role or designation (for example, police officer, detective, supervisor, paramedic, firefighter, and the like). As another example, paramedics and firefighters might be grouped into two different talk groups even though they are responding to the same public safety incident.

Figure 1B:
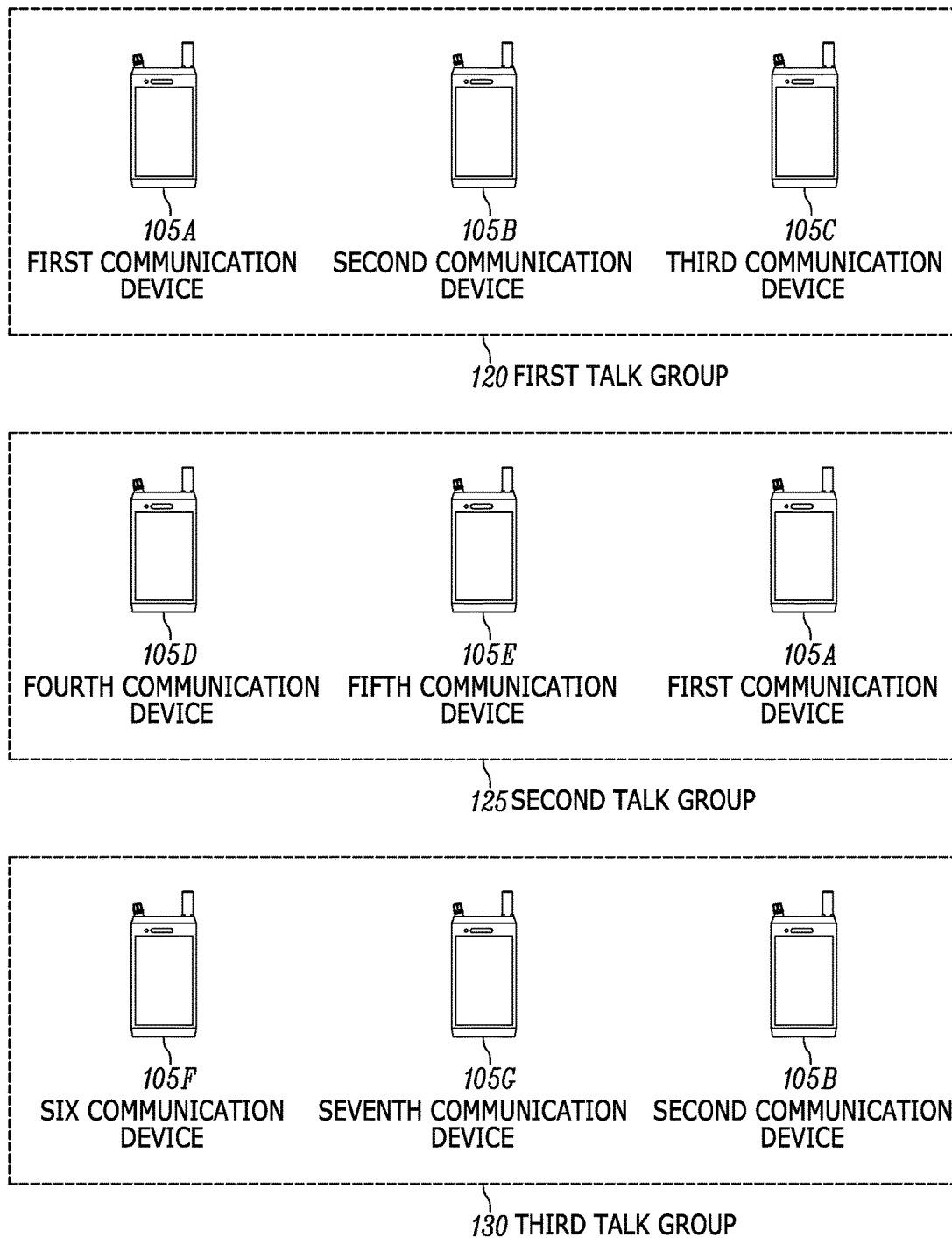
FIG. 1B illustrates a graphical representation of three exemplary talk groups that include communication devices of the communication system of FIG. 1A.

FIG. 1B illustrates a graphical representation of three exemplary talk groups 120, 125, and 130 that include the communication devices 105A through 105G of FIG. 1A. In other words, each communication device 105A through 105G is affiliated with at least one talk group. As indicated by FIG. 1B, communication devices may be affiliated with more than one talk group. For example, the first communication device 105A is affiliated with both the first talk group 120 and the second talk group 125. As shown in FIG. 1B, the first talk group 120 includes the first communication device 105A, the second communication device 105B, and the third communication device 105C. The second talk group 125 includes the fourth communication device 105D, the fifth communication device 105E, and the first communication device 105A. The third talk group 130 includes the sixth communication device 105F, the seventh communication device 105G, and the second communication device 105B.

Throughout the following description, reference is made to the talk groups 120, 125, and 130 and the communication devices 105A through 105G to provide examples of the methods and systems being explained. The talk groups 120, 125, and 130 are merely exemplary and have been simplified for the sake of explanation. In some embodiments, the communication system 100 includes more or fewer communication devices and more or fewer talk groups. In some embodiments, the talk groups have more or fewer affiliated communication devices. In some embodiments, the talk groups do not have the same number of affiliated communication devices.

Figure 2:
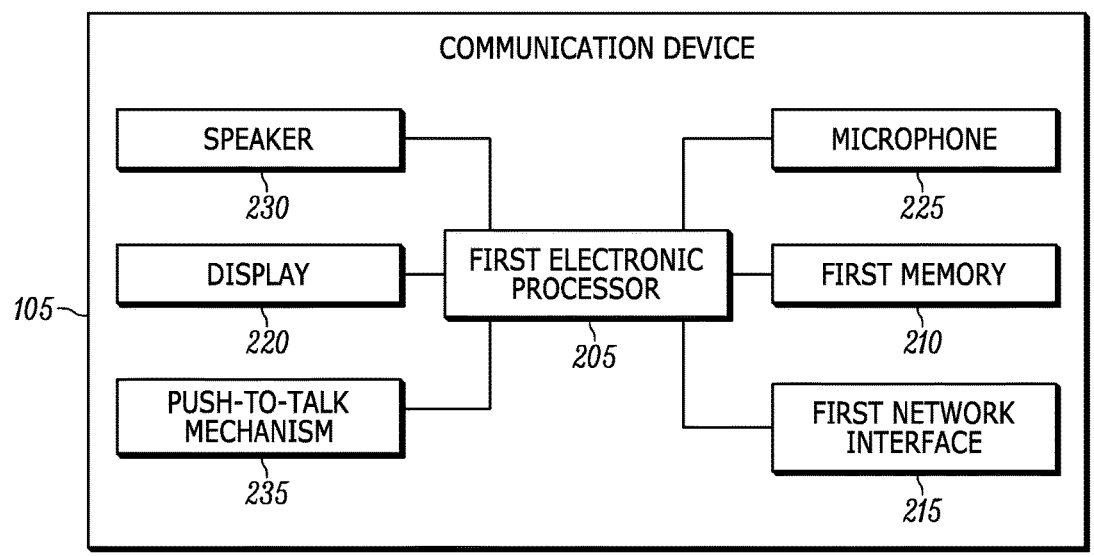
FIG. 2 is a diagram of a communication device included in the communication system of FIG. 1A according to one embodiment.

FIG. 2 is a block diagram of a communication device 105 of the communication system 100 according to one embodiment. The communication device 105 includes a first electronic processor 205 (for example, a microprocessor or another electronic device). The first electronic processor 205 may include input and output interfaces (not shown) and be electrically connected to a first memory 210, a first network interface 215, a display 220, a microphone 225, a speaker 230, and a push-to-talk mechanism 235 In some embodiments, the communication device 105 may include fewer or additional components in configurations different from that illustrated in FIG. 2. For example, in some embodiments, the communication device 105 also includes a camera and a location component (for example, a global positioning system receiver). In some embodiments, the communication device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from the network 110. For example, the first network interface 215 may include a transceiver for wirelessly communicating with the network 110. Alternatively or in addition, the first network interface 215 may include a connector or port for receiving a wired connection to the network 110, such as an Ethernet cable. The first electronic processor 205 receives electrical signals representing sound from the microphone 225 and may communicate information relating to the electrical signals over the network 110 through the first network interface 215, such as for receipt by another communication device 105. Similarly, the first electronic processor 205 may output data received from the network 110 through the first network interface 215, such as from another communication device 105, through the speaker 230, the display 220, or a combination thereof.

In some embodiments, the push-to-talk mechanism 235 allows a user of the first communication device 105 to initiate communication over the network 110. For example, when the first electronic processor 205 detects that the push-to-talk mechanism 235 is enabled, the first electronic processor 205 communicates sound data detected by the microphone 225 over the network 110 (for example, as a half-duplex communication signal). In some embodiments, the sound data is communicated to other communication devices that are affiliated with a talk group to which the communication device 105 is broadcasting. When the first electronic processor 205 detects that the push-to-talk mechanism 235 is no longer enabled (for example, has been released), the first electronic processor 205 stops the communication of the sound data. In some embodiments, the push-to-talk mechanism 235 may be a mechanical button or knob or a virtual button or knob displayed on the display 220, which may include a touchscreen. In some embodiments, the push-to-talk mechanism 235 may be a mechanical button or knob on an accessory that is separate from and communicates with the communication device 105 (for example, a button or knob on a remote speaker-microphone).

As noted previously herein, the communication devices 105A through 105G may be affiliated with one or more talk groups associated with the network 110. To be affiliated with a particular talk group (in other words, to join a talk group), the communications device 105 may receive an input representing a user selection of a particular available talk group. For example, the first memory 210 of the communication device 105 may store a list of one or more available talk groups (for example, identifiers of available talk groups with an assigned frequency or channel). The list of available talk groups may be displayed on a user interface of the display 220. The user interface of the display 220 may receive an input from a user selecting one of the available talk groups. In some embodiments, available talk groups may be assigned to discrete positions of a rotatable knob or other input mechanisms included on the communication device 105 that receive input from a user selecting one of the positions. The first electronic processor 205 determines the talk group associated with the selected position to select an available talk group. In some embodiments, the communication device 105 receives the list of available talk groups (or a portion thereof including updates thereof) from the server 115.

In some embodiments, the communication device 105 may also automatically join a particular talk group based on instructions received from the server 115 or another device external to the communication device 105. For example, upon arriving at the scene of an incident, the server 115 may instruct the communication device 105 to join a talk group associated with the incident. Similarly, as a user of the communication device 105 is assigned to different organizations, departments, or roles, the server 115 may instruct the communication device 105 to join a particular talk group.

Figure 3:
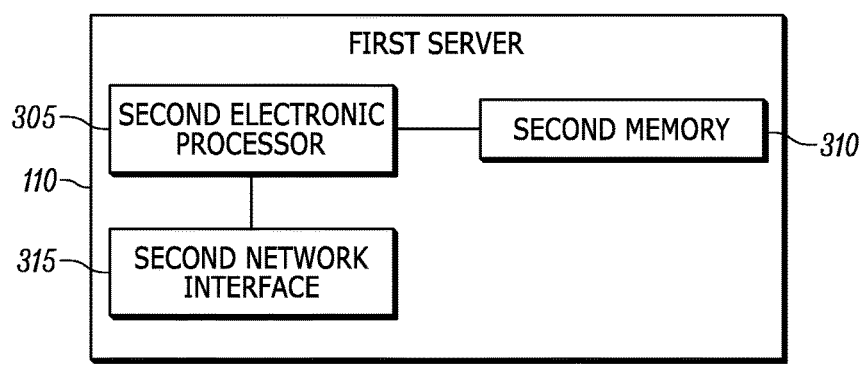
FIG. 3 is a diagram of a server included in the communication system of FIG. 1A according to one embodiment.

FIG. 3 is a block diagram of the server 115 according to one embodiment. In the example illustrated, the server 115 is a computer that includes a second electronic processor 305, an input/output interface (not shown), a second memory 310, and a second network interface 315. These components are similar to those described above with respect to the communication device 105 and perform similar functions. As noted previously herein, in some embodiments, the server 115 monitors the communication devices 105 by receiving characteristics of the communication devices 105 (for example, talk group affiliations, battery level, and the like) from the communication devices 105 through the second network interface 315. In some embodiments, characteristics of the communication devices 105 may be stored in the second memory 310 by the second electronic processor 305.

For example, the second memory 310 may store which communication devices 105 are affiliated with each talk group. The second memory 310 may also store a number of talk group affiliations for each communication device 105 (in other words, how many talk groups each communication device 105 is affiliated with). The second memory 310 may also store a battery level of each communication device 105 (in other words, a charge level of a battery, a percentage of battery charge remaining, an amount of time remaining until the battery is fully discharged, and the like). The second memory 310 may also store a level of affiliation of each communication device 105 with each talk group. For example, each communication device 105 may be affiliated with a selected talk group such that when the push-to-talk mechanism 235 is pressed, sound data from the communication device 105 is transmitted to the selected talk group. In some embodiments, the communication device 105 joins any call intended for its selected talk group. All other talk groups that the communication device 105 is affiliated with may be merely for receiving data from other communication devices and may be referred to as monitored talk groups. In some embodiments, the communication device 105 joins a call intended for one of its monitored talk groups only if its selected talk group does not have a call in progress. Based on the functionality of the communication device 105 with respect to its selected talk group and its monitored talk groups, in some embodiments, the communication device 105 is considered to have a higher level of affiliation with its selected talk group than with its monitored talk groups. The characteristics of the communication devices 105 described previously herein are merely exemplary. In some embodiments, the second memory 310 may store more or fewer characteristics of the communication devices 105.

In some embodiments, at least some of the information described above as being stored by the second memory 310 (for example, affiliation information of communication devices 105) may be stored in a database or other network element that is separate from the server 115 (in other words, a group affiliation database). In such embodiments, the separate database may communicate with the server 115 over the network 110 such that the server 115 receives information stored in the separate database.

The second memory 310 may also store information relating to a status of each communication device 105. For example, each communication device 105 may be in a connected state, an idle state, or an artificially-connected state. In the connected state, the communication device 105 is engaged in communication over the network 110. For example, when the communication devices 105 of a talk group are engaged in a call, such communication devices 105 are in the connected state. As another example, a communication device 105 is in the connected state when the communication device 105 is retrieving data from the server 115. For example, an application on the communication device 105 (such as a weather application) may periodically retrieve data from the server 115. During this data retrieval, the communication device 105 is in the connected state.

The opposite of the connected state is the idle state. In the idle state, the communication device 105 is not engaged in communication over the network 110. In some embodiments, when a call is made to a talk group that has at least one affiliated communication device in the connected state, the call setup time is faster than when a call is made to a talk group that has all affiliated communication devices in the idle state. For example, because at least one affiliated communication device is already in the connected state, some of the functions required for call setup have already been completed (for example, paging the target communication device, establishment of a data channel for the target communication to enable the target communication device to send and receive data to and from the network 110, activating an application processor to schedule a push-to-talk application, and the like). As referred to herein, call setup time is the time that it takes to provide a talk permit tone to a communication device that is an originator of a call after at least one receiving communication device has joined the call.

In some embodiments, the server 115 controls at least one communication device to be in the artificially-connected state when the at least one communication device would otherwise be in an idle state. In the artificially-connected state, the communication device 105 is not engaged in communication over the network 110, but the server 115 may enable a subset of functions from a full list of functions that are required to complete call setup when a call is made to or from the talk group. For example, the communication device 105 may maintain a connection to the network 110 with an active data channel such that the communication device 105 does not experience network paging or data channel establishment delay when the communication device 105 joins a future call to a talk group that it is affiliated with. In some embodiments, to maintain the connection between the communication device and the network 110, the server 115 may periodically send a heartbeat message to the communication device 105. At a later time when a call is made to a talk group that the communication device 105 is affiliated with, the call setup time is faster than when all of the affiliated communication devices are in the idle state because some of the functions to complete call setup have already been completed.

Although the heartbeat message is described as being sent from the server 115, in some embodiments, the server 115 informs a communication device 105 that the communication device 105 should maintain itself in the artificially-connected state for a predetermined period of time or until further notice from the server 115. In such embodiments, the communication device 105 periodically sends a heartbeat message to the server 115 to keep itself in the artificially-connected state. In some embodiments, the communication device 105 periodically wakes up to receive a message from the server 115. In some embodiments, the server 115 or the communication device 105 keeps the communication device 105 in the artificially-connected state in other ways besides sending the heartbeat message.

In some embodiments, when in the artificially-connected state, the communication device 105 periodically switches from the idle state to activate one or more functions associated with call setup. In such embodiments, periodic activation of the one or more functions may be controlled by the communication device 105 or the server 115.

As noted previously herein, decreasing call setup time for a communication device often increases power consumption of the communication device. In accordance with this relationship, the communication device 105 may consume more power in the connected state and the artificially-connected state than in the idle state. However, when only one communication device within a talk group is in the connected state or the artificially-connected state, the call setup time for any call to or from the talk group from another communication device is faster than when all communication devices within the talk group are in the idle state.

Figure 4:
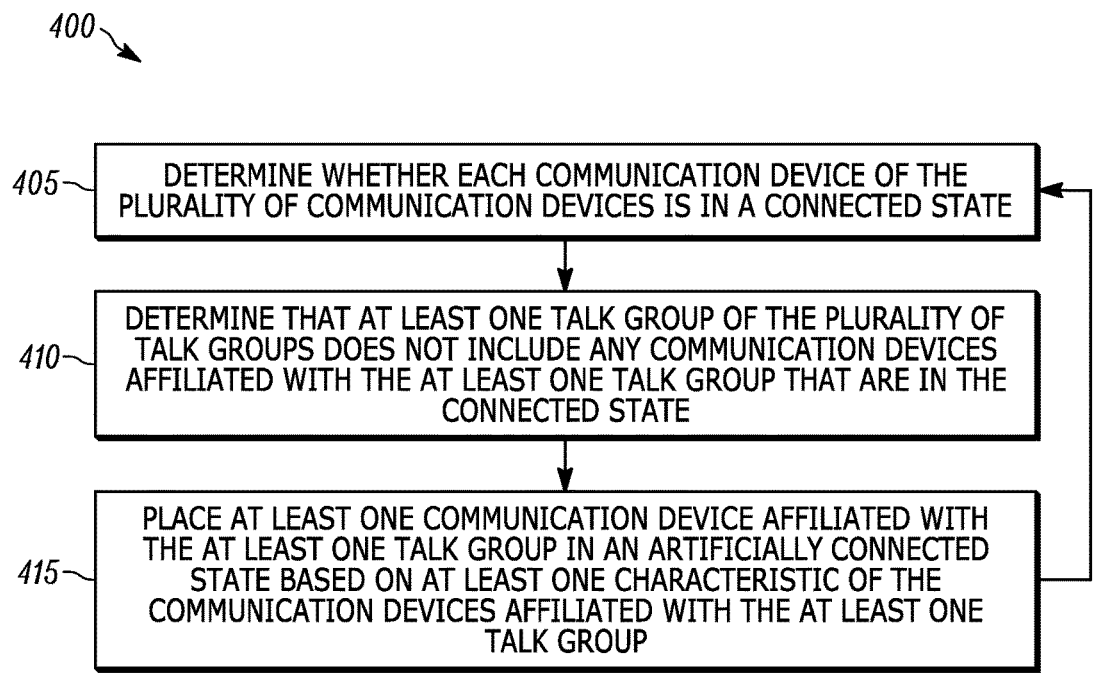
FIG. 4 is a flowchart of a method of controlling a plurality of communication devices performed by the server of FIG. 3 according to one embodiment.

Accordingly, to decrease call setup time and to limit the effect that the decreased call setup time has on the power consumption of communication devices 105, the server 115 may perform a method 400 illustrated in FIG. 4. The method 400 is used to monitor a plurality of communication devices affiliated with a plurality of talk groups and keep at least one communication device 105 affiliated with each talk group in a connected state or an artificially-connected state.

Although the method 400 is explained as keeping at least one communication device affiliated with each talk group in the connected state or the artificially-connected state, in some embodiments, the method 400 is used to monitor a plurality of communication devices affiliated with a plurality of talk groups and keep at least two communication devices 105 affiliated with each talk group in a connected state or an artificially-connected state. As explained in greater detail below, such embodiments may provide additional advantages over embodiments that keep at least one communication device 105 affiliated with each talk group in a connected state or an artificially-connected state.

FIG. 4 illustrates the exemplary method 400 of controlling a plurality of communication devices. The method 400 is described as being executed by the server 115 and, in particular, the second electronic processor 305. However, in some embodiments, the method 400 is performed by another device (for example, another computer or one of the communication devices 105).

At block 405, the second electronic processor 305 determines whether each communication device 105 of the plurality of communication devices is in the connected state. For example, the second electronic processor 305 may determine whether each communication device 105 is engaged in communication over the network 110. In some embodiments, the second electronic processor 305 may store the status of each communication device 105 in the second memory 310. As mentioned previously herein, the second memory 310 may also store which communication devices 105 are affiliated with each talk group.

Based on the communication devices 105 determined to be in the connected state, at block 410, the second electronic processor 305 determines that at least one talk group of the plurality of talk groups does not include any communication devices 105 affiliated with the at least one talk group that are in the connected state. In other words, the second electronic processor 305 determines that all of the communication devices 105 in at least one talk group are in the idle state (such a talk group is referred to hereinafter as an idle talk group). To decrease call setup time in the event that a call is made to the at least one talk group in the future, at block 415, the second electronic processor 305 places at least one communication device 105 affiliated with the at least one talk group in the artificially-connected state. The at least one communication device 105 is placed in the artificially-connected state based on at least one characteristic of the communication devices 105 affiliated with the at least one talk group as explained in greater detail below with respect to FIG. 5.

With reference to FIG. 1B, the second electronic processor 305 may determine that the first communication device 105A and the fourth communication device 105D are in the connected state while the remaining communication devices 105B, 105C, 105E, 105F, and 105G are in the idle state (at block 405). In this example, the first talk group 120 and the second talk group 125 include at least one affiliated communication device in the connected state. The second electronic processor 305 determines that the third talk group 130 does not include any affiliated communication devices in the connected state (at block 410). Accordingly, the second electronic processor 305 places one of the communication devices affiliated with third talk group 130 (in other words, one of the second communication device 105B, the sixth communication device 105F, and the seventh communication device 105G) in the artificially-connected state based on at least one characteristic of the communication devices 105B, 105F, and 105G.

In some embodiments, after block 405, the second electronic processor 305 may determine that each talk group includes at least one communication device 105 in the connected state. In such situations, the second electronic processor 305 may remain at block 405 and continue to monitor the status of each communication device 105 until the second electronic processor 305 determines that at least one talk group does not include any affiliated communication devices in the connected state at block 410.

Figure 5:
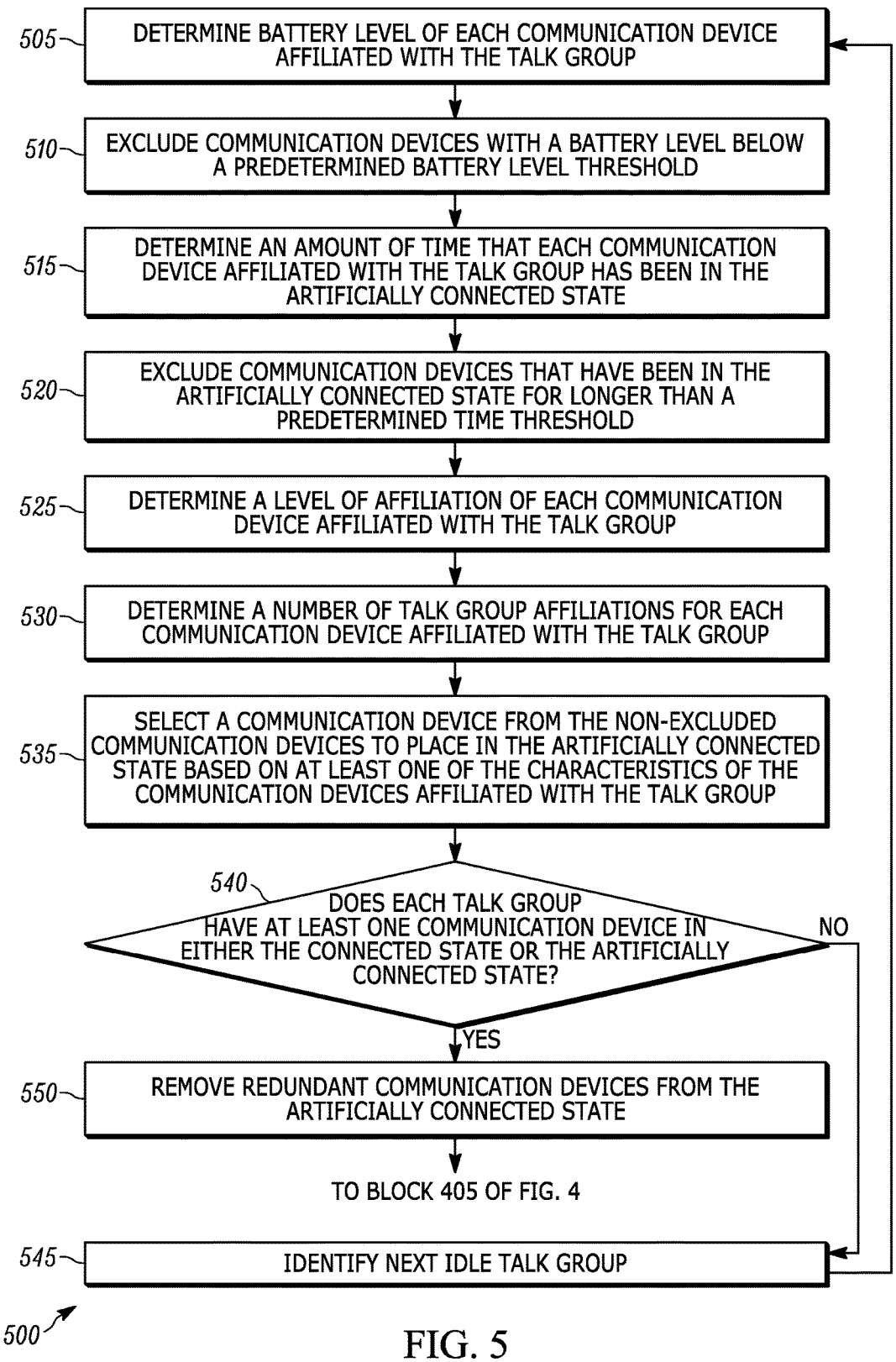
FIG. 5 is a flowchart of a method of selecting a communication device from the communication system of FIG. 1A to be placed in an artificially-connected state. The method of FIG. 5 is a sub-method of the method of FIG. 4.

FIG. 5 illustrates an exemplary method 500 of selecting a communication device 105 affiliated with an idle talk group to be placed in the artificially-connected state. The method 500 is a sub-method of block 415 of FIG. 4. In other words, the method 500 is executed as a part of block 415 of FIG.

4. In some embodiments, the method 500 controls different communication devices 105 within a talk group to maintain an artificially-connected state such that the talk group may more quickly transmit and receive calls. Through repetition of the method 400, the second electronic processor 305 distributes increased power consumption caused by placing communication devices in the artificially-connected state to a number of communication devices affiliated with each idle talk group. As explained in greater detail below, in some embodiments, each time the method 400 repeats, the method 500 is executed one time for each idle talk group identified at block 410 of FIG. 4. Accordingly, based on the number of such identified idle talk groups, the method 500 may repeat such that a communication device is placed in the artificially-connected state for each identified idle talk group.

At block 505, the second electronic processor 305 determines a battery level of each communication device affiliated with the idle talk group. For example, the second electronic processor 305 may retrieve the battery level of each affiliated communication device that is stored in the second memory 310 as explained previously herein. At block 510, the second electronic processor 305 excludes communication devices with a battery level below a predetermined battery level threshold. For example, affiliated communication devices with a battery level below 50% may be excluded from being placed in the artificially-connected state. As mentioned previously herein, a communication device in the artificially-connected state consumes more power than a communication device in the idle state. Accordingly, in some embodiments, the second electronic processor 305 will not place a communication device in the artificially-connected state when the battery level of the communication device is below the predetermined battery level threshold. The 50% battery level threshold is merely exemplary and may be higher or lower in some embodiments. In some embodiments, the predetermined battery threshold may be based on other characteristics of the battery level. For example, the predetermined battery threshold may be a predetermined amount of time until the battery is fully discharged.

At block 515, the second electronic processor 305 determines an amount of time that each communication device affiliated with the idle talk group has been in the artificially-connected state. For example, when a communication device 105 is placed in the artificially-connected state, the server 115, the communication device 105, or both may start a timer to keep track of the amount of time that the communication device 105 remains in the artificially-connected state. When the communication device 105 leaves the artificially-connected state, the server 115, the communication device 105, or both may stop the timer. The amount of time that the communication device 105 is in the artificially-connected state may be stored in the second memory 310 along with the other characteristics of the communication device 105 as described previously herein.

At block 520, the second electronic processor 305 excludes communication devices that have been in the artificially-connected state for longer than a predetermined time threshold. For example, affiliated communication devices that have been in the artificially-connected state for more than ten minutes within the past twenty four hours may be excluded from being placed in the artificially-connected state. As indicated by this example, in some embodiments, the amount of time that a communication device has been in the artificially-connected state is only stored for a limited period of time (for example, the previous twenty four hours).

In some embodiments, the second electronic processor 305 adjusts the predetermined time threshold depending on the number of communication devices affiliated with a talk group. For example, a talk group with a large number of affiliated communication devices (for example, five hundred) may have a lower predetermined time threshold than a talk group with a small number of affiliated communication devices (for example, ten). This difference in predetermined time thresholds allows talk groups with different numbers of affiliated communication devices to maintain at least one affiliated communication device in the artificially-connected state while distributing excess power consumption approximately evenly across the affiliated communication devices in each talk group. In some embodiments, the second electronic processor 305 adjusts the predetermined time threshold depending on the number of affiliated communication devices that have a battery level above the predetermined battery level threshold. The ten minute time threshold during a period of twenty four hours is merely exemplary. Both the ten minute time threshold and the limited period of twenty four hours may be higher or lower in some embodiments.

At block 525, the second electronic processor 305 determines a level of affiliation of each communication device affiliated with the idle talk group. For example, the second electronic processor 305 may retrieve the level of affiliation of each affiliated communication device that is stored in the second memory 310 as explained previously herein. At block 530, the second electronic processor 305 determines a number of talk group affiliations for each communication device affiliated with the idle talk group (in other words, how many other talk groups each communication device is affiliated with). For example, the second electronic processor 305 may retrieve the number of talk group affiliations for each affiliated communication device stored in the second memory 310 as explained previously herein.

At block 535, the second electronic processor 305 selects a communication device from the non-excluded, affiliated communication devices to place in the artificially-connected state based on at least one of the characteristics of the affiliated communication devices. For example, the second electronic processor 305 may select a communication device with the highest number of talk group affiliations among the non-excluded, affiliated communication devices. As another example, the second electronic processor 305 may select a communication device that has a higher level of affiliation with the idle talk group than the other non-excluded, affiliated communication devices.

In some embodiments, selecting a communication device that has a higher level of affiliation with the idle talk group may improve the probability that call setup time is decreased upon a future call being made to the idle talk group. For example, as explained previously herein, the communication device 105 joins any call intended for its selected talk group while the communication device 105 joins a call intended for one of its monitored talk groups only if its selected talk group does not have a call in progress. Accordingly, when a communication device that has the idle talk group as its selected talk group is placed in the artificially-connected state, the probability of the artificially-connected communication device joining a call intended for the idle talk group, and therefore decreasing the call setup time, is higher than when the idle talk group is a monitored talk group of the artificially-connected communication device.

As other examples of characteristics of the affiliated communication devices used by the second electronic processor 305 to select a communication device to place in the artificially-connected state, the second electronic processor 305 may select a communication device with the highest battery level or with the least amount of time spent in the artificially-connected state. As yet another example, in some embodiments, the second electronic processor 305 may determine a subset of communication devices that have been in the artificially-connected state for an amount of time less than a predetermined time threshold. Then, from the subset of communication devices, the second electronic processor 305 may select a communication device with the highest battery level to place in the artificially-connected state.

At block 540, the second electronic processor 305 determines whether each talk group of the plurality of talk groups has at least one communication device in either the connected state or the artificially-connected state. When the second electronic processor 305 determines (or in response to determining) that at least one talk group does not include any affiliated communication devices in the connected state or the artificially-connected state (in other words, all affiliated communication devices of at least one talk group are in the idle state), at block 545, the second electronic processor 305 identifies the next idle talk group and proceeds back to block 505 to select a communication device affiliated with the next idle talk group to place in the artificially-connected state. Accordingly, the method 500 repeats until all idle talk groups of the plurality of talk groups include at least one affiliated communication device in the connected state or the artificially-connected state. In other words, the method 500 repeats until there are not any idle talk groups remaining in the plurality of talk groups.

With reference to FIG. 1B, when only the seventh communication device 105G is in the connected state, the second electronic processor 305 identifies the first talk group 120 and the second talk group 125 as idle talk groups. The second electronic processor 305 may execute the method 500 to determine which affiliated communication device 105A, 105B, or 105C of the first talk group 120 to place in the artificially-connected state. In some situations, the second electronic processor 305 places the first communication device 105A in the artificially-connected state because the first communication device 105A is affiliated with both the first talk group 120 and another talk group (namely, the second talk group 125). In such a situation, at block 540, the method 500 does not repeat because all talk groups 120, 125, and 130 include at least one affiliated communication device in the connected state or the artificially-connected state.

However, in an alternate situation where the first communication device 105A could not be placed in the artificially-connected state (for example, because the battery level of the first communication device 105A is below the predetermined battery level threshold), the second electronic processor 305 may place the third communication device 105C in the artificially-connected state. In such a situation, at block 540, the second electronic processor 305 determines that the second talk group 125 still does not include at least one affiliated communication device that is in the connected state or the artificially-connected state. Accordingly, the second electronic processor 305 identifies the second talk group 125 as an idle talk group and repeats the method 500 to place one of the affiliated communication devices 105A, 105D, and 105E of the second talk group 125 in the artificially-connected state.

When the second electronic processor 305 determines that each talk group has at least one communication device in either the connected state or the artificially-connected state, at block 550, the second electronic processor 305 removes redundant communication devices from the artificially-connected state. In other words, the second electronic processor 305 places redundant communication devices that are in the artificially-connected state into the idle state. In some embodiments, a communication device in the artificially-connected state is considered to be redundant when all talk groups that the communication device is affiliated with include at least one other communication device that is in the connected state or the artificially-connected state. In such a situation, it is unnecessary for the communication device to remain in the artificially-connected state because all talk groups with which the communication device is affiliated have at least one other communication device in the connected or artificially-connected state. Removing the communication device from the artificially-connected state prevents unnecessary power consumption by the communication device while still ensuring that all talk groups have at least one communication device in the connected state or the artificially-connected state.

With reference to FIG. 1B, the second electronic processor 305 may have already executed the method 400 such that the first communication device 105A and the sixth communication device 105F are in the artificially-connected state while the remaining communication devices 105B, 105C, 105D, 105E, and 105G are in the idle state. In some situations, the seventh communication device 105G may enter the connected state (for example, to participate in a call). At block 550, the second electronic processor 305 determines that the sixth communication device 105F is redundantly placed in the artificially-connected state because when the sixth communication device 105F leaves the artificially-connected state, all talk groups 120, 125, and 130 still have at least one affiliated communication device in the connected state or the artificially-connected state. Accordingly, at block 550, the second electronic processor 305 removes the sixth communication device 105F from the artificially-connected state.

After the second electronic processor 305 removes redundant communication devices from the artificially-connected state at block 550, the method 500 proceeds back to block 405 of FIG. 4 to repeat the method 400 as mentioned previously herein.

As the method 400 repeats, the second electronic processor 305 reevaluates the status of the communication devices 105 (for example, at blocks 505, 515, 525, and 530). In some embodiments, the second electronic processor 305 determines that at least one communication device affiliated with an idle talk group has been in the artificially-connected state for longer than a predetermined time threshold (at blocks 515 and 520). When the second electronic processor 305 makes such a determination, the second electronic processor 305 places the communication device in the idle state and places another communication device affiliated with the idle talk group in the artificially-connected state. By doing so, the second electronic processor 305 allows the idle talk group to remain artificially-connected to the server 115 while distributing increased power consumption caused by the artificially-connected state to a number of communication devices 105 affiliated with the idle talk group.

The methods 400 and 500 of FIGS. 4 and 5 are merely exemplary. In some embodiments, the blocks and the methods may be executed in a different order or may include fewer or additional blocks to achieve the result of ensuring that all talk groups of the plurality of talk groups have at least one communication device that is in the connected state or the artificially-connected state.

For example, in some embodiments, at block 415, the second electronic processor 305 may place communication devices in the artificially-connected state as a function of time. In other words, the second electronic processor 305 may ensure that each talk group has at least one communication device in the artificially-connected state by scheduling affiliated communication devices to be in the artificially-connected state during predetermined time slots in round robin fashion. For example, the second electronic processor 305 may place a first subset of communication devices in the artificially-connected state for a predetermined time period. After the predetermined time period elapses, the second electronic processor 305 removes the first subset of communication devices from the artificially-connected state and places a second subset of communication devices in the artificially-connected state for the predetermined time period. The second electronic processor 305 may repeat this process of placing a subset of communication devices in the artificially-connected state for the predetermined time period such that all talk groups of the plurality of talk groups have at least one communication device in the artificially-connected state at all times.

In such embodiments, the second electronic processor 305 may not remove redundant communication devices from the artificially-connected state when another affiliated communication device enters the connected state. In such embodiments, the second electronic processor 305 may include all communication devices affiliated with each talk group when scheduling subsets of communication devices to be placed in the artificially-connected state. However, in alternate embodiments, the second electronic processor 305 may include only the non-excluded, affiliated communication devices as determined at blocks 510 and 520 when scheduling subsets of communication devices to be placed in the artificially-connected state.

As mentioned previously herein, in some embodiments, the method 400 repeats. In some embodiments, the method 400 repeats continuously. In other embodiments, the method 400 repeats after a predetermined time period (for example, every ten seconds). In some embodiments, the method 400 repeats based on the occurrence of certain events (for example, a call setup event or call teardown event that causes at least one communication device to transition from one state to another state, a notification from a communication device that the communication device has changed states, and the like).

As mentioned previously herein, although the method 400 is explained as keeping at least one communication device affiliated with each talk group in the connected state or the artificially-connected state, in some embodiments, the method 400 is used to keep at least two communication devices 105 affiliated with each talk group in a connected state or an artificially-connected state. Such embodiments allow for decreased call setup times in more situations than embodiments that keep at least one communication device 105 affiliated with each talk group in a connected state or an artificially-connected state. For example, when a talk group has only one affiliated communication device in the connected or artificially-connected state, decreased call setup time cannot be realized when the already connected or artificially-connected communication device initiates a call intended for the talk group because there are not any other affiliated communication devices in the connected or artificially-connected state. However, when the talk group has at least two affiliated communication devices in the connected or artificially-connected states, when either connected or artificially-connected communication device initiates a call intended for the talk group, the other connected or artificially-connected communication device allows for decreased call setup time as explained previously herein.

The method 400 and its corresponding details as described previously herein may be executed similarly to keep at least two communication devices 105 affiliated with each talk group in the connected state or the artificially-connected state. For example, in embodiments where at least two communication devices 105 are kept in the connected or artificially-connected state, a communication device in the artificially-connected state is considered to be redundant when all talk groups that the communication device is affiliated with include at least two other communication devices in the connected state or the artificially-connected state. In some embodiments, the second electronic processor 305 may execute a similar method as the method 400 to keep more than two communication devices affiliated with each talk group in the connected state or the artificially-connected state.

The methods 400 and 500 were described above as being executed by the second electronic processor 305 to ensure that all talk groups of a plurality of talk groups have at least one communication device that is in the connected state or the artificially-connected state. In some embodiments, the second electronic processor 305 may exclude one or more talk groups from the plurality of talk groups when executing the methods 400 and 500.

The second electronic processor 305 selects which talk groups are included in the plurality of talk groups based on at least one of the group consisting of a priority level of each talk group, an association of each talk group to an incident, a number of communication devices affiliated with each talk group, a priority level of communication devices affiliated with each talk group, and a role of users of communication devices affiliated with each talk group.

In some embodiments, the second electronic processor 305 may select talk groups that have a higher priority than other talk groups. For example, a talk group that includes affiliated communication devices operated by first responders at an emergency situation may be of higher priority than other talk groups. In this example, the talk group that includes affiliated communication devices operated by first responders may be included in the plurality of talk groups to ensure fast communication between affiliated communication devices. In some embodiments, the priority level of each talk group may be predetermined or statically-determined (for example, public safety talk groups may have a higher priority level than citizen talk groups). In other embodiments, the priority level of each talk group may be dynamically-determined (for example, when a member of a public safety talk group experiences an emergency situation, the public safety talk group may be given a higher priority level than other public safety talk groups while until the emergency ends).

In some embodiments, the second electronic processor 305 may select talk groups that have affiliated communication devices associated with an incident. For example, a talk group that includes communication devices used by public safety personnel (for example, police officers, firefighters, paramedics, and the like) that are handling an incident (for example, a fire, a fight, and the like) may be included in the plurality of talk groups to ensure fast communication between affiliated communication devices.

In some embodiments, the second electronic processor 305 selects talk groups to be included in the plurality of talk groups based on the number of communication devices affiliated with each talk group. For example, the second electronic processor 305 may exclude a talk group from the plurality of talk groups when the talk group has less than a predetermined number of affiliated communication devices (for example, less than five affiliated communication devices).

In some embodiments, the second electronic processor 305 selects talk groups to be included in the plurality of talk groups based on the priority level of communication devices affiliated with each talk group or a role of users of communication devices affiliated with each talk group. For example, a talk group that includes communication devices used by one or more public safety leaders (for example, police chief, fire chief, and the like) may be included in the plurality of talk groups to ensure that fast communication from the one or more public safety leaders occurs.

The factors evaluated by the second electronic processor 305 to select which talk groups are included in the plurality of talk groups are merely exemplary. In some embodiments, the second electronic processor 305 selects which talk groups are included in the plurality of talk groups based on other characteristics of the talk groups. In some embodiments, an administrator or other user may select the talk groups included in the plurality of talk groups.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A server for a communication system in which each of a plurality of communication devices is affiliated with at least one talk group among a plurality of talk groups, the server comprising an electronic processor configured to:
   determine whether each communication device of the plurality of communication devices is in a connected state, wherein a communication device in the connected state is configured to engage in communications over an active data channel;
   determine that at least one talk group of the plurality of talk groups does not include any communication devices affiliated with the at least one talk group that are in the connected state; and place at least one communication device affiliated with the at least one talk group in an artificially-connected state based on at least one characteristic of the communication devices affiliated with the at least one talk group and in response to determining that the at least one talk group does not include any communication devices affiliated with the at least one talk group that are in the connected state.

2. The server of claim 1, wherein the electronic processor places the at least one communication device in the artificially-connected state by enabling a subset of functions from a full list of functions that are required to complete call setup when a call is made to or from the at least one talk group.

3. The server of claim 1, wherein the electronic processor is further configured to:
place a first subset of communication devices in the artificially-connected state for a predetermined time period; and
when the predetermined time period elapses,
remove the first subset of communication devices from the artificially-connected state, and
place a second subset of communication devices in the artificially-connected state for the predetermined time period.

4. The server of claim 1, wherein the electronic processor is further configured to
determine that the at least one communication device has been in the artificially-connected state for longer than a predetermined time threshold;
place another communication device affiliated with the at least one talk group in the artificially-connected state in response to determining that the at least one communication device has been in the artificially-connected state for longer than the predetermined time threshold; and
place the at least one communication device in an idle state in response to determining that the at least one communication device has been in the artificially-connected state for longer than the predetermined time threshold, wherein the at least one communication device is not configured to engage in communications over a data channel in the idle state.

5. The server of claim 1, wherein the electronic processor is further configured to
determine that another communication device affiliated with the at least one talk group has entered the connected state; and
place the at least one communication device in an idle state in response to determining that the another communication device affiliated with the at least one talk group has entered the connected state.

6. The server of claim 1, wherein the at least one characteristic of the communication devices affiliated with the at least one talk group is selected from the group consisting of
an amount of time that each communication device affiliated with the at least one talk group has been in the artificially-connected state;
a battery level of each communication device affiliated with the at least one talk group;
a level of affiliation of each communication device affiliated with the at least one talk group; and
a number of talk group affiliations for each communication device affiliated with the at least one talk group.

7. The server of claim 1, further comprising a network interface configured to receive a battery level of each communication device affiliated with the at least one talk group;
wherein the electronic processor is configured to place the at least one communication device affiliated with the at least one talk group in the artificially-connected state based on which of the communication devices affiliated with the at least one talk group has a highest battery level.

8. The server of claim 1, further comprising a network interface configured to receive a battery level of each communication device affiliated with the at least one talk group;
wherein the electronic processor is further configured to
determine an amount of time that each communication device affiliated with the at least one talk group has been in the artificially-connected state; and
determine a subset of communication devices for which the respective amount of time is below a predetermined time threshold;
wherein the at least one communication device placed in the artificially-connected state has a highest battery level of the communication devices included in the subset of communication devices.

9. The server of claim 1, wherein the electronic processor is further configured to select the plurality of talk groups based on at least one of the group consisting of a statically-determined priority level of each talk group, a dynamically-determined priority level of each talk group, an association of each talk group to an incident, a number of communication devices affiliated with each talk group, a priority level of communication devices affiliated with each talk group, and a role of users of communication devices affiliated with each talk group.

10. The server of claim 1, wherein the electronic processor is further configured to place the at least one communication device affiliated with the at least one talk group in the artificially-connected state based on the at least one characteristic of the communication devices affiliated with the at least one talk group such that at least two communication devices affiliated with the at least one talk group are in either the connected state or the artificially-connected state.

11. A method of controlling a plurality of communication devices, each communication device being affiliated with at least one talk group among a plurality of talk groups, the method comprising:
determining whether each communication device of the plurality of communication devices is in a connected state, wherein a communication device in the connected state is configured to engage in communications over an active data channel;
determining that at least one talk group of the plurality of talk groups does not include any communication devices affiliated with the at least one talk group that are in the connected state; and
placing at least one communication device affiliated with the at least one talk group in an artificially-connected state based on at least one characteristic of the communication devices affiliated with the at least one talk group and in response to determining that the at least one talk group does not include any communication devices affiliated with the at least one talk group that are in the connected state.

12. The method of claim 11, wherein placing the at least one communication device in the artificially-connected state includes enabling a subset of functions from a full list of functions that are required to complete call setup when a call is made to or from the at least one talk group.

13. The method of claim 11, further comprising:
placing a first subset of communication devices in the artificially-connected state for a predetermined time period; and
when the predetermined time period elapses,
removing the first subset of communication devices from the artificially-connected state, and
placing a second subset of communication devices in the artificially-connected state for the predetermined time period.

14. The method of claim 11, further comprising:
determining that the at least one communication device has been in the artificially-connected state for longer than a predetermined time threshold;
placing another communication device affiliated with the at least one talk group in the artificially-connected state in response to determining that the at least one communication device has been in the artificially-connected state for longer than the predetermined time threshold; and
placing the at least one communication device in an idle state in response to determining that the at least one communication device has been in the artificially-connected state for longer than the predetermined time threshold, wherein the at least one communication device is not configured to engage in communications over a data channel in the idle state.

15. The method of claim 11, further comprising:
determining that another communication device affiliated with the at least one talk group has entered the connected state; and
placing the at least one communication device in an idle state in response to determining that the another communication device affiliated with the at least one talk group has entered the connected state.

16. The method of claim 11, wherein placing the at least one communication device affiliated with the at least one talk group in the artificially-connected state based on the at least one characteristic of the communication devices affiliated with the at least one talk group includes placing the at least one communication device affiliated with the at least one talk group in the artificially-connected state based on at least one characteristic from the group consisting of:
an amount of time that each communication device affiliated with the at least one talk group has been in the artificially-connected state;
a battery level of each communication device affiliated with the at least one talk group;
a level of affiliation of each communication device affiliated with the at least one talk group; and
a number of talk group affiliations for each communication device affiliated with the at least one talk group.

17. The method of claim 11, further comprising:
receiving a battery level of each communication device affiliated with the at least one talk group; and
placing the at least one communication device affiliated with the at least one talk group in the artificially-connected state based on which of the communication devices affiliated with the at least one talk group has a highest battery level.

18. The method of claim 11, further comprising:
receiving a battery level of each communication device affiliated with the at least one talk group;
determining an amount of time that each communication device affiliated with the at least one talk group has been in the artificially-connected state; and
determining a subset of communication devices for which the respective amount of time is below a predetermined time threshold; and
placing the at least one communication device in the artificially-connected state that has a highest battery level of the communication devices included in the subset of communication devices.

19. The method of claim 11, further comprising selecting the plurality of talk groups based on at least one of the group consisting of a statically-determined priority level of each talk group, a dynamically-determined priority level of each talk group, an association of each talk group to an incident, a number of communication devices affiliated with each talk group, a priority level of communication devices affiliated with each talk group, and a role of users of communication devices affiliated with each talk group.

20. The method of claim 11, wherein placing the at least one communication device affiliated with the at least one talk group in the artificially-connected state based on the at least one characteristic of the communication devices affiliated with the at least one talk group includes placing the at least one communication device affiliated with the at least one talk group in the artificially-connected state based on the at least one characteristic of the communication devices affiliated with the at least one talk group such that at least two communication devices affiliated with the at least one talk group are in either the connected state or the artificially-connected state.

* * * * *